ULTRAVIOLET ABSORPTION CURVE

United States Patent Office 3,780,172
Patented Dec. 18, 1973

3,780,172
ANTIBIOTIC NO. 1308 AND PROCESS FOR PRODUCING THE SAME
Isao Takeda, Tokyo, Masayuki Mizuno, Saitama, Toshiaki Sugawara and Yukiji Shimojima, Tokyo, and Sadayuki Horiguchi, Kanagawa, Japan, assignors to Asahi Kasei Kogyo Kabushiki Kaisha, Osaka, Japan
Filed Oct. 19, 1971, Ser. No. 190,477
Claims priority, application Japan, Nov. 17, 1970, 45/100,705
Int. Cl. A61k 21/00
U.S. Cl. 424—122     2 Claims

ABSTRACT OF THE DISCLOSURE

New antibiotic No. 1308 useful for controlling the growth of molds, particularly rice blast molds, having the elementary analysis values of C, 67.62%, H, 9.67% and the balance O, a melting point from 128° to 132° C., a molecular weight of 770, optical rotation of $[\alpha]_D^{18}$ −50.5 (c.=2 in methanol), and the infrared and ultraviolet absorption spectra shown in the accompanying FIGS. 1 and 2.

Figure 1:
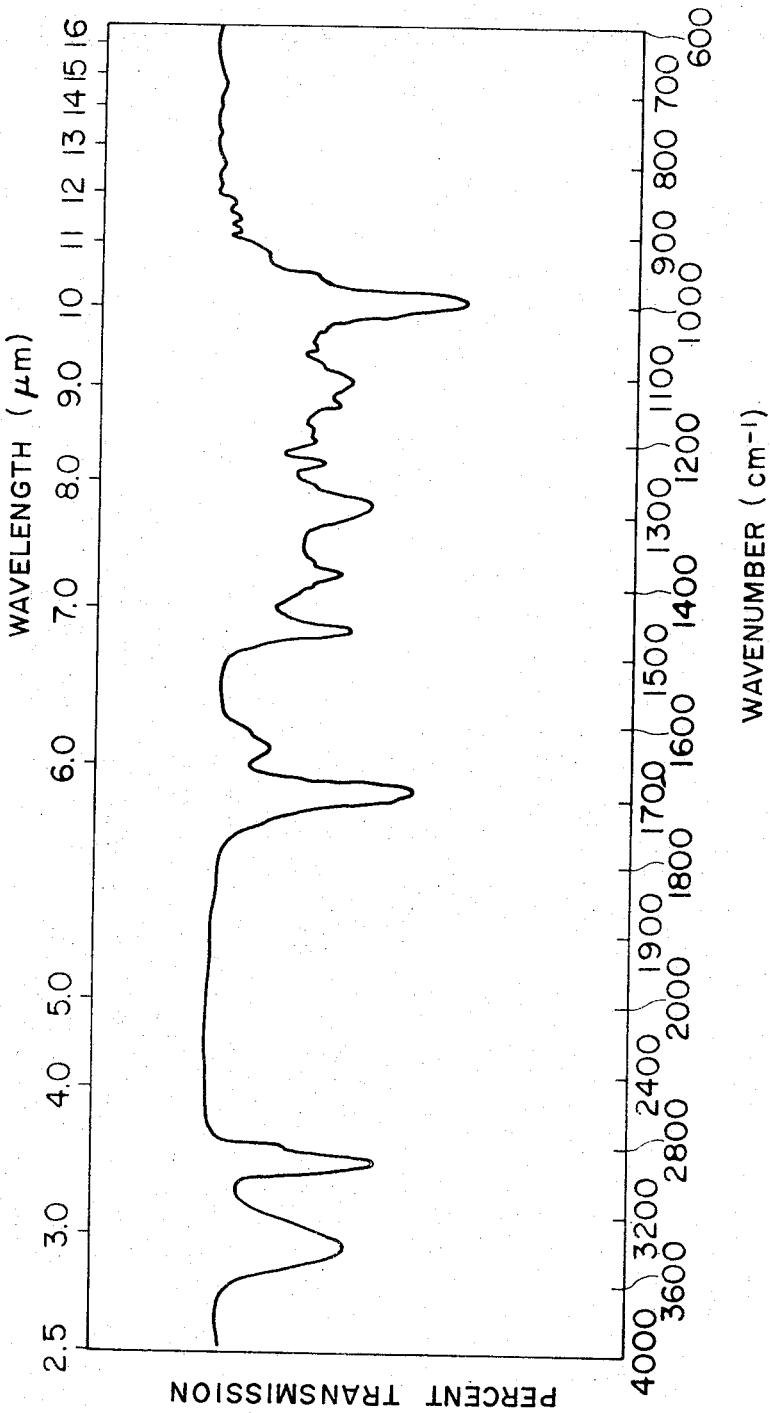

The antibiotic is obtained by culturing Streptomyces 1308 (NRRL 5318) in a medium containing a carbon source, a nitrogen source and inorganic salts, and recovering the resulting active substance from both mycelium and culture filtrate.

---

This invention relates to novel antibiotic No. 1308 which greatly inhibits the growth of molds, particularly plant pathogenic molds, and a process for producing the same.

An object of this invention is to provide the novel antibiotic No. 1308. Another object of this invention is to provide a method for producing the novel antibiotic No. 1308 by fermentation. Other objects and advantages of this invention will be apparent from the description set forth hereinbelow.

The microorganism used in the present invention is a strain of the genus Streptomyces which can produce in the culture medium the antibiotic No. 1308 in an amount sufficient to be recovered. As an illustrative strain of the genus Streptomyces, there may be mentioned, for example, a microorganism which was isolated as the result of systematic studies made by the present inventors. This microorganism was identified in our culture collection by the code number Streptomyces 1308 and has been deposited in Fermentation Research Institute, Agency of Industrial Science and Technology, Chiba City, Japan, under FERM-P No. 708. This strain has also been deposited with the U.S. Department of Agriculture, Northern Regional Research Laboratory, Peoria, Ill., United States of America, and has been given the number NRRL 5318. A sample of this microorganism can be obtained from aforesaid Research Laboratory. The deposit was made with aforementioned Research Laboratory with all restrictions on the availability to the public being irrevocably removed upon the granting of the patent.

The Streptomyces 1308 strain has the following Taxonomic properties.

(I) MORPHOLOGICAL CHARACTERISTICS

Monopodially branched and straight sporophores formed on yeast extract-starch agar. Open loops are occasionally formed on the tip. Spores oval, 1.5 to 1.8 by 2.8 to 3.0 microns, surface-warty.

(II) BEHAVIORS ON VARIOUS MEDIA (1) Czapek's agar: Good growth, cream-colored. Aerial mycelium white, scant; no soluble pigment.

(2) Asparagine-glucose agar: White, filamentous growth, penetrating into the medium. No aerial mycelium; no soluble pigment.

(3) Ca-malate agar: Good growth, white; aerial mycelium abundant, white, fluffy. No soluble pigment.

(4) Glucose-Czapek broth: Poor growth at the bottom, white, fluffy; no pigment.

(5) Nutrient agar: Grayish brown growth, surface rigid, glossy. No aerial mycelium; scant brown pigment.

(6) Loeffler's serum: Poor growth milky brown-colored. No aerial mycelium; no soluble pigment.

(7) Peptone-glucose agar: Growth cream-colored; aerial mycelium white, powdery. Scant pale brown soluble pigment.

(8) Egg-albumin agar: Ivory-colored medium growth, penetrating into the agar. Very scant white, powdery aerial mycelium.

(9) Gelatin: Surface growth white; medium liquefaction; scant brown pigment.

(10) Starch agar: Growth ivory- to cream-colored; aerial mycelium white, powdery. No soluble pigment. Starch is hydrolyzed.

(11) Tyrosin agar: Restricted growth with rigid, brown surface. A small amount of melanin is formed.

(12) Litmus milk: Bottom growth; milk peptonized without coagulation.

(13) Cellulose medium; No growth.

(III) UTILIZATION OF CARBON SOURCES

Good growth with utilization of xylose, arabinose, glucose, fructose, sucrose, raffinose, mannitol, inositol, galactose, maltose and insulin, but scantily utilizes rhamnose, salicin, sorbitol, sodium citrate and sodium succinate and does not utilize sodium acetate.

Amongst other antibiotic-producing strains, there have been known Hondamycin-producing strain No. 771 and Streptomyces albochromogenes, which is an Orymycin-producing strain. These known strains, however, do not coincide morphologically with the strain No. 1308 in that the sporophores thereof are spiral whereas those of the strain No. 1308 are straight. Furthermore, when the Hondamycin-producing strain and the Streptomyces 1308-producing strain are compared with each other, the surface of spores is spiny in the case of the former, but warty in the case of the latter. This is the greatest morphological difference between the two. As to the utilization of a carbon source also, the two differ such that when xylose or arabinose is used, the Streptomyces 1308-producing strain shows good growth whereas the Hondamycin-producing strain shows no growth.

Reference: Journal of Antibiotics, vol. 22, pages 521, 528 and 536 (1969).

Other strains which are relatively similar in morphological behavior to strain No. 1308 include Streptomyces kitasawaensis, Streptomyces bikiniensis and Streptomyces diastatochromogenes. When compared in physiological properties, however, these strains differ from the strain No. 1308 in the following points:

Streptomyces kitasawaensis forms a yellowish brown or greenish yellow pigment on starch agar and asparagine-glucose agar, whereas the strain No. 1308 scarcely forms a pigment on said media. In a gelatin medium, Streptomyces kitasawaensis forms a dark brown pigment, whereas the strain No. 1308 forms no pigment.

Streptomyces bikiniensis shows vigorous growth in any media of Czapek's agar, asparagine-glucose agar, glucose-Czapek broth, nutrient agar and is quite excellent in production of aerial mycelium, whereas the strain No. 1308 is scant or none in production of aerial mycelium.

Streptomyces diastatochromogenes is an Oligomycin-producing strain and has a melanin pigment-forming ability whereas the strain No. 1308 has no or little ability of forming melanin pigment. Further, the former is strong in nitrate reducing power, whereas the latter is weak in such power. In glucose-asparagine agar, the former produces an aerial mycelium, whereas the latter produces no aerial mycelium.

Thus, there are found no strains which coincide in behavior with strain No. 1308. It is therefore considered proper to classify strain No. 1308 as a new strain.

Procedures for production of present anti-biotic No. 1308 by culture of the aforesaid strain and for isolation of said substance from the culture are explained below.

The strain produces anti-biotic No. 1308 even in a socalled synthetic medium containing, for example, glucose, sucrose or glycerin as a carbon source and containing no organic nitrogen source. A medium containing, for example, polypeptone, meat extract, yeast extract or corn steep liquor as a nitrogen source and containing molasses as a carbon source, may also be used. A medium containing soluble starch and soybean meal as main components and, in addition thereto, such inorganic salts as, for example, calcium carbonate, potassium nitrate, magnesium sulfate, ammonium sulfate, ammonium nitrate, potassium phosphates and sodium chloride, is most preferred. Culturing is preferably conducted aerobically under shaking at 25°~35° C. for 24 to 96 hours. PH for the culture is preferably from 6 to 9.

The antibiotic formed is accumulated in both the mycelium of Streptomyces 1308 and the culture filtrate, and is easily and efficiently isolated from the former by extraction with actone or methanol and from the latter by extraction with ethyl ether or n-butanol. The antibiotics which have individually been obtained from the culture filtrate and the mycelium, are treated, respectively, by means of active carbon chromatography, silica gel chromatography, or thin layer chromatography, etc. The two antibiotics are entirely identical with each other in Rf values in thin layer chromatography using various solvents, infrared absorption spectrum, ultraviolet, absorption spectrum and biological activity. This means that the two are the same substance.

The thus obtained novel antibiotic No. 1308 displays, both in pure state and crude state, useful effects for the control of plant diseases due to various fungi, particularly rice blast disease, and has physicochemical properties such as mentioned below.

(1) Elementary analysis: The substance is composed of the 3 elements C, H and O. C: 67.62%; H: 9.67%, O: the balance. It contains no N, P, S, halogens and metals.

(2) Melting point: 128 °to 132° C.

(3) Infrared absorption spectrum: as shown in FIG. 1.

Figure 2:
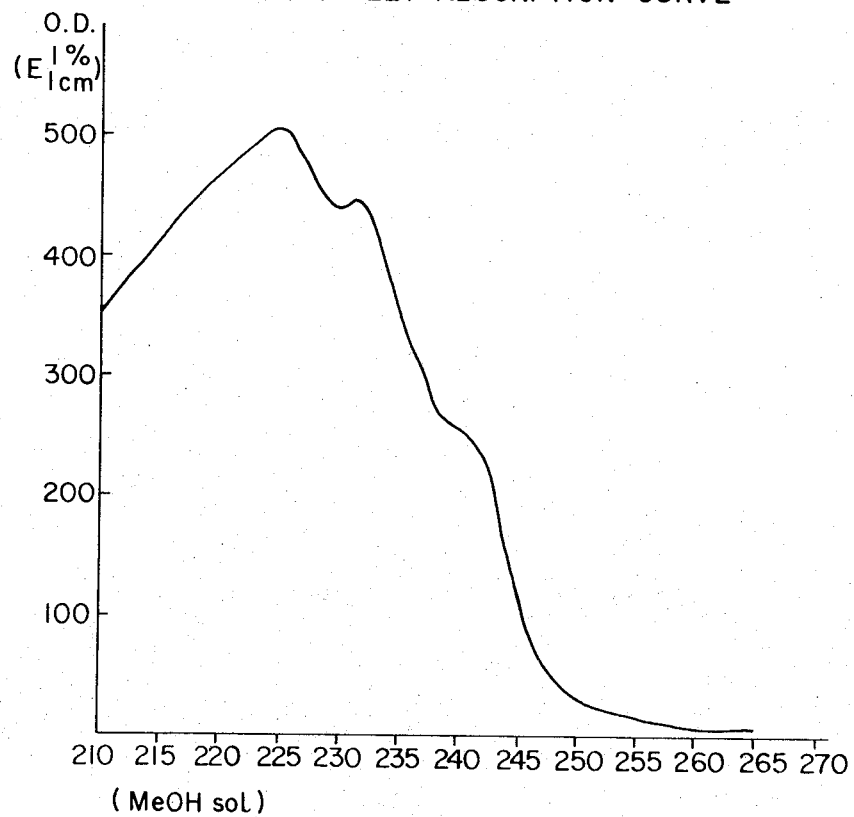

(4) Ultraviolet absorption spectrum: as shown in FIG. 2.

(5) Molecular weight: 770.

(6) Solubility in solvents: Soluble in ethyl acetate, benzene, ethyl ether, n-butanol, ethanol, methanol, methylethylketone and acetone, and insoluble in n-hexane, petroleum ether and water.

(7) Optical rotation: $[\alpha]_D^{18} = -50.5$ (c.=2 in methanol).

(8) Color reaction: Positive in Baeyer's reaction and Tollens reaction, and iodine absorptive. Exhibits a bluish purple color on a thin silica gel layer by spraying anisaldehyde-sulfuric acid reagent and heating.

(9) It is a neutral substance.

(10) Purified standard product is a white powder.

(11) Stability: In a dry state, the substance is quite stable at room temperature. Even in the form of a solution in a solvent, the substance is stable, but is deactivated when heated at 100° C. for 10 minutes at above pH 11. Furthermore, it is stable to ultraviolet irradiation.

(12) Antimicrobial actions: Antimicrobial actions of the present antibiotic on various microorganisms were tested by agar streak method. In the test, nutrient agar was used for bacteria, glucose-yeast extract-maltose extract agar for molds, and 0.5% malt extract-incorporated nutrient agar for yeasts. The results obtained are as shown below.

| Test microorganisms: | Minimum inhibitory concentration ($\gamma$/ml.) |
|---|---|
| Staphylococcus aureus FAD 209P | >100 |
| Bacillus subtilis PCI 219 | >100 |
| Sarcina lutea PCI 1001 | >100 |
| Erwinia carotovora IFO 3057 | >100 |
| Xanthomonas oryzae IAM 1657 | >100 |
| Xanthomonas citri IFO 3835 | >100 |
| Escherichia coli K-12 | >100 |
| Vibrio metschnikovii B-3-6 | >100 |
| Mycobacterium 607 | >100 |
| Pseudomonas aeruginosa IAM 1057 | >100 |
| Pseudomonas solanacearum | <1 |
| Aspergillus oryzae L | >100 |
| Aspergillus niger ATCC 6275 | 10 |
| Rhizopus nigricans EHRENBERG SN32 | 100 |
| Penicillium citrinum ATCC 9849 | >100 |
| Trichophyton mentagrophytes IAM 5064 | 10 |
| Trichophyton asteroides | 10 |
| Glomerella lagenarium IAM 8051 | <1 |
| Alternaria kikuchiana | <1 |
| Fusarium oxysporum | 10 |
| Botrytis cinerea | <1 |
| Helminthosporium sigmoideum | <1 |
| Piricularia oryzae | <1 |
| Candida albicans (Robin) Berkhout IAM 4888 | >100 |
| Saccharomyces cerevisiae Hansen Kyokai-6 | >100 |

As is clear from the above-mentioned antimicrobial spectrum, the present antibiotic specifically inhibits the growth of molds, without any substantial antimicrobial actions on bacteria and yeasts, and hence can be used as an antifungal substance for various purposes.

Antibiotic No. 1308 is different from Hondamycin, Orymycin, Oligomycin or Hikomycin, in the following points:

Comparison in $R_f$ values of paper chromatography:

| Antibiotic | $R_f$ values | |
|---|---|---|
|  | Solvent I | Solvent II |
| Antibiotic No. 1308 | 0.19 | 0.27 |
| Hondamycin | 0.19 | 0.27 |
| Orymycin | 0.21 | 0.34 |
| Oligomycins | 0.15 / 0.23 / 0.30 | 0.24 / 0.35 / 0.44 |

NOTE.—Solvent I=16% hydrated n-propanol; Solvent II=18% hydrated n-propanol. Reference: Journal of Antibiotics, vol. 22, page 521, 1969.

Difference from Hikomycin

Antibiotic No. 1308 is not inactivated even when heated at 100° C. for 10 minutes at pH 2, but is rather deactivated when heated in an alkaline state (pH 11). In contrast thereto, Hikomycin is inactivated when a suspension thereof in distilled water is heated at 100° C. and, at pH 2 or less, this tendency is marked even at 60° C. Reference: Japanese patent publication No. 15,642/62.

Difference from Hondamycin

A comparison between Hondamycin and antibiotic No. 1308 in infrared absorption curve in chloroform shows that in the former, there are observed at 1600 cm.$^{-1}$ an absorption of conjugated double bond, in addition to an absorpton at 1650 cm.$^{-1}$ which indicates the presence of non-conjugated double bond and whose intensity is substantially identical with that of the above absorption; whereas in the latter, no absorption is observed at 1600 cm.$^{-1}$.

In view of the above, the antibiotic No. 1308 is considered to be a novel antibiotic which is obviously different from Orymycin, Oligomycin, Hikomycin and Hondamycin.

The novel antibiotic No. 1308 obtained according to the present invention can be used as a chemical for controlling plant diseases derived from various molds. Particularly, the antibiotic displays prominent effectiveness as a chemical for controlling rice blast disease, in rice plantation. In this case, the antibiotic No. 1308 may be used as an active ingredient either alone or in admixture with other chemical having rice blast-controlling effect, such as for example, Kasugamycin or the like.

In actual application, the present antibiotic is used in admixture with a suitable carrier and may be formulated into any of such forms as dusts, wettable powders, emulsifiable concentrates, etc., as in the case of known agricultural chemicals. The carrier may be a solid or liquid carrier. Examples of the solid carrier include vegetable flours (e.g. soybean, tobacco, walnut, wheat and rice flours), mineral powders (e.g. kaolin, clay, talc, bentonite, terra alba, talcum, diatomaceous earth and mica powder), alumina, silica gel, sulfur powder and active carbon. These may be used either alone or in the form of a mixture of 2 or more. Examples of the liquid carrier include water, alcohols (e.g. methanol, ethanol and ethylene glycol), ketones (e.g. acetone and methylethylketone), aliphatic hydrocarbons (e.g. gasoline, kerosene, machine oil and fuel oil), organic bases (e.g. pyridine and picoline), acid amides (e.g. dimethylformamide, etc.) nitriles (e.g. acetonitrile, etc.) and esters (e.g. ethyl acetate, etc.). These may be used either alone or in admixture of 2 or more.

As surface active agents, which are added as such adjuvants or adjutants as spreaders, emulsifiers, penetrants, dispersants and solubilizers in order to formulate the present effective substance into desired forms, there are used, for example, soaps, sulfuric esters of higher alcohols, sulfonated oils, ethanolamine soap, esters of higher fatty acids, alkylarylsulfonation products, quaternary ammonium salts, alkylene oxide type surface active agents and anhydro-sorbitol type surface active agents. In addition thereto, there may be used or added for the above-mentioned purpose, if necessary, casein, gelatin, agar, starch, bentonite and aluminum hydroxide.

The thus formulated preparations may be used in admixture with insecticides (synthetic and natural insecticides), miticides, nematocides, fungicides, herbicides, plant growth regulators, synergists, attractants and the like chemicals, whereby the preparations can be made broader in application scope and enhanced in control effect.

In case the present antibiotic is applied as a rice blast disease controlling agent, it is preferable that a preparation containing the antibiotic is sprayed in such proportion that the amount of the active ingredient is 1 to 100 mg. per m.$^2$. An effective amount of antibiotic for the control of rice blast disease varies, of course, depending on the variety, developed stage, growth state and fertilized state of rice plants to be treated, and on such application conditions as the weather conditions, the state of outbreak of pests and the attack degree of rice plants.

Generally, the concentration of the active ingredient in the preparation is preferably about 1 to 10% in the case of emulsifiable concentrate or wettable powder, and about 0.05 to 1.0% in the case of oil spray or dust, though the concentration is variable depending on application purposes.

The emulsifiable concentrate or wettable powder may be sprayed after it is diluted with water or the like liquid to 50 to 2,000 times, as will be mentioned later.

Procedures for preparation and application of the present antibiotic as dust, wettable powder and emulsifiable concentrate are explained in detail below.

Dust: 0.1 to 0.3 part by weight of the present effective substance and 99.5 to 99.0 parts by weight of the aforesaid solid carrier are mixed and pulverized together, and the resulting dust is dusted as it is.

Wettable powder: 1 to 5 parts by weight of the present effective substance, 30 to 80 parts by weight of the aforesaid solid carrier and 15 to 69 parts by weight of suitable adjutants are mixed together to prepare a wettable powder. In actual application, the wettable powder is diluted with water or other liquid carrier, and the resulting dilution is applied.

Emulsifiable concentrate: 1 to 5 parts by weight of the present effective substance, 30 to 80 parts by weight of the aforesaid liquid carrier and 15 to 69 parts by weight of suitable adjutants are mixed together to prepare an emulsifiable concentrate. In actual application, the emulsifiable concentrate is diluted with water or other liquid carrier to a desired concentration, and the resulting dilution is sprayed.

The production of the present antibiotic No. 1308 is illustrated below with reference to examples.

EXAMPLE 1

Streptomyces 1308 (FERM-P No. 708: NRRL 5318) was inoculated to a 500 ml. shaking flask containing 100 ml. of a medium comprising 2% of soluble starch, 1% of soybean meal, 0.1% of dibasic potassium phosphate, 0.3% of sodium chloride, 0.05% of magnesium sulfate and 0.2% of calcium carbonate (pH 7.0 before sterilization), and then shaken reciprocally at 30° C. for 72 hours. 1 liter of acetone was added to 1 liter of whole broth to stand overnight at 30° C., and then the cell residue was separated by filtration. The thus obtained acetone extract was subjected to column containing 20 g. of granular active carbon (produced by Wako Jun-yaku Co.) which had been equilibrated with an acetone-water mixture (volume ratio 1:1), thereby adsorbing an active ingredient on the active carbon. Subsequently, the column was washed with the said acetone-water mixture and an acetone-water-pyridine mixture (volume ratio 10:10:1) in this order. Thereafter, the active ingredient was eluted with an acetone-pyridine mixture (volume ratio 9:1). The amount of the active ingredient obtained was 200 mg. The residue was applied to column containing 30 g. of silica gel (60 to 200 mesh, produced by Nishio Kogyo Co.), and the column was washed with an ether-petroleum ether mixture (volume ratio 1:3) and an ether-petroleum ether mixture (volume ratio 1:1) in this order. The active ingredient was eluted with an ether-petroleum ether mixture (volume ratio 3:1). The amount of the active ingredient obtained was 98 mg. The active fraction obtained in the silica gel chromatography was subjected to thin layer chromatography using silica gel (B-O, produced by Wako Jun-yaku Co.) and a solvent system comprising ether and petroleum ether (volume ratio 3:1). Thereafter, portions showing $R_f$ values of 0.35 to 0.4 were recovered by stripping, and the active ingredient was eluted from the silica gel by ether extraction to obtain 21 mg. of the desired antibiotic.

EXAMPLE 2

Streptomyces 1308 (FERM-P No. 708: NRRL 5318) was inoculated to a 500 ml. shaking flask containing 100 ml. of a medium of the same composition as in Example 1, and shaken reciprocally at 30° C. for 24 hours. Each 50 ml. of the resulting culture was added under sterile conditions to each of 5 liter Erlenmeyer flasks containing 1 liter of the same medium as mentioned above, and then shaken rotary at 30° C. for 72 hours. Thereafter, 10 liters of the culture were centrifugally separated at 3,000 r.p.m. for 10 minutes into a cell residue and a culture liquor. Two liters of acetone were added to the cell residue and the mixture was tightly closed in a vessel and shaken at 30° C. for 1 hour, and then a residue was separated by filtration to obtain an acetone extract of the cell. The culture liquor and the acetone extract were passed in this order through a column (volume 100 ml.) of granular active carbon (produced by Wako Jun-yaku Co.) charged with water. Subsequently, the same washing, elution, silica gel chromatography and thin layer chromatography were effected to obtain 350 mg. of a purified standard product.

EXAMPLE 3

500 milliliters of the culture, which had been obtained in Example 2 by culturing Streptomyces 1308 (FERM-P No. 708: NRRL 5318) for 24 hours in a shaking flask, were transferred to a 20 liter jar fermentor containing 10 liters of the same medium as in Example 1, and then aerobically cultured with stirring at 28° C. for 40 hours. The amount of air introduced was 10 liters per minute, and the stirring speed was 350 r.p.m. For the elimination of bubbles formed during the culture, there was occasionally used an aqueous 10 times-dilution of silicon (KM 70, produced by Shin-etsu Kagaku Co.).

After completion of the culture, the same after-treatments as in Example 2 were effected to obtain 230 mg. of antibiotic No. 1308.

Actual applications as rice blast disease-controlling chemicals of the antibiotic No. 1308 obtained in Examples 1 to 3 are illustrated below with reference to examples.

EXAMPLE 4

To determine the protective effect of antibiotic No. 1308 on rice blast disease, the pot test was carried out as follows.

The preparation of the spray solution was carried out in the following manner:

Antibiotic No. 1308 was dissolved in methanol to form a solution containing 10 mg. of the antibiotic per ml. of the solution. This solution was diluted with water to a given concentration. Subsequently, 0.01%, in terms of final concentration, of "Rino" (Transliteration; produced by Nippon Noyaku Co.; aqueous solution containing 20% of alkyl phenol polyethyleneglycol and 12% of lignin sulphonic acid salt) was added as a spreader to prepare the spray solution.

As a control chemical, there was used "Kasumin Liquid" (produced by Hokko Kagaku Co.; containing 2% of Kasugamycin). The control chemical was formed into a spray solution by diluting the chemical with water to 1,000 times and then adding "Rino" to the dilution.

Each 20 rice grains (the variety of "Saitama Mochi No. 10) just before germination were sowed in a pot of 9 cm. in diameter containing soil. At the three leaves' age, rice plants in pots were placed on a turn table and sprayed by use of a spray gun with 50 ml. per 3 pots of each of the test chemical solutions. After drying the chemical solution in air, the rice plants were infected with rice blast fungus by spraying spore suspension of *Pyricularia oryzae*. The pots were kept in a moist chamber for 20 hours at 24~27° C. and thereafter the pots were placed in greenhouse.

Seven days after infection, the total number of lesions in each area (3 pots) were counted and the protective value was calculated as follows:

Protective value (percent)
$$= \frac{\text{Number of lesions in non-treated area} - \text{Number of lesions in chemical-sprayed area}}{\text{Number of lesions in non-treated area}} \times 100$$

For the counting of the number of lesions, there were used a total of 60 plants in 3 pots.

The total number of lesion per rice plant in non-treated area was 392. No phytotoxicity was observed in any area.

The results obtained were as set forth in the following table:

| Chemical | Concentration (p.p.m.) | Protective value (percent) |
|---|---|---|
| Antibiotic No. 1308 | 80 | 98 |
| Do | 40 | 98 |
| Do | 20 | 95 |
| Do | 10 | 80 |
| Do | 5 | 71 |
| Do | 2.5 | 65 |
| Do | 1.25 | 50 |
| Kasugamycin | 20 | 98 |
| Non-treated area | | |

EXAMPLE 5

Antibiotic No. 1308 was subjected to a bed test to investigate the effectiveness thereof.

In a bed, 30 g. of ammonium sulfate, 30 g. of perphosphate and 10 g. of potassium chloride per m.$^2$ were applied as basal fertilizer. Rice seeds (variety: Aichiasahi) in a proportion of 100 g. per m.$^2$ were sowed in lanes at intervals of 10 cm. Each area consisted of three parts of 1 m.$^2$. On the 17th and 20th days after the sowing, rice plants were sprayed with 140 ml. per m.$^2$ of each chemical solution prepared in Example 1.

As a control chemical solution, an aqueous 1,000 times-dilution of "Kasumin Liquid" which had been added with the same spreader as in Example 1 was used.

On the 25th day after the sowing, damage degree by rice blast in each area was compared each other. Since the outbreak of rice blast in non-treated area had been so vigorous and frequent, the rice plants in said area were completed withered. No phytotoxicity was observed in every sprayed area.

The results obtained were as set forth in the following table:

| Chemical | Concentration (p.p.m.) | Healthy degree Area 1 | 2 | 3 | Average |
|---|---|---|---|---|---|
| Antibiotic No. 1308 | 80 | 75 | 85 | 80 | 80 |
| Do | 40 | 75 | 70 | 75 | 73 |
| Do | 20 | 50 | 60 | 55 | 55 |
| Do | 10 | 30 | 40 | 45 | 38 |
| Kasugamycin | 20 | 80 | 85 | 85 | 83 |
| Non-treated area | | | | | |

Healthy degree was stated as follows:

Normal growth with no damage caused by rice blast disease ------ 100
Completely withered by rice blast disease ------ 0

EXAMPLE 6

Rice plants (variety: Waseasahi No. 2), the seeds of which had been sowed on May 16, were transplanted on June 10 in soil in a proportion of 2 roots per 30 cm. x 15 cm. To the soil were applied as fertilizers 30 kg. of ammonium sulfate, 20 kg. of calcium perphosphate and 10 kg. of potassium chloride per 10 areas. On July 10, 10 kg. of ammonium sulfate was additionally applied to the soil. Each area consisted of two parts of 9 m.$^2$ in same field. On September 3 (when the rice plants began to come into ears) and on September 8 (when the rice plants all came into ears), the rice plants in each area were sprayed with 4 kg. per 10 ares of a dust prepared by homogeneously mixing and pulverizing 0.2 part by weight of antibiotic No. 1308 and 99.8 parts by weight of talc. As a control dust, there was used "Kasumin Dust" (containing 0.2% of Kasugamycin, produced by Hokko Kagaku Co.).

Early in July, the outbreak of rice leaf blast was first observed, but the extent thereof was slight. Thereafter, rice ear blast propagated, but the propagation was medium, and the progress of disease was slow. On October 4 and 13, the degree of damage of 20 rice plants in each area was investigated. On October 29, the rice plants in area of 3.3 m.² were mowed to investigate the yield of rice grains.

The results obtained were as set forth in the following table:

| Chemical | Damaged degree | | Weight of unhulled rice (g.) | Weight of unpolished rice (g.) |
|---|---|---|---|---|
| | Oct. 4 | Oct. 13 | | |
| Antibiotic No. 1308 | 4.31 | 14.46 | 1,835 | 1,455 |
| | 6.42 | 22.78 | 1,840 | 1,435 |
| Kasugamycin | 9.68 | 24.99 | 1,780 | 1,400 |
| | 7.78 | 19.36 | 1,715 | 1,350 |
| Non-treated area | 25.66 | 42.25 | 1,640 | 1,205 |
| | 24.82 | 39.96 | 1,595 | 1,150 |

Note: The damaged degree was observed and calculated according to the following equation:

Damaged degree = rate (percent) of ears infected with ear blast disease +0.8× rate (percent) of stem blast infected with stem blast disease (plants damaged more than ⅔) +0.5× rate (percent) of stem blast (plants damaged ⅔ to ⅓) +0.2× rate (percent) of stem blast (plants damaged less than ⅓).

What is claimed is:

1. Antibiotic No. 1308 having an elementary analysis values of C, 67.62%, H, 9.67% and O the balance, a melting point from 128° to 132° C., a molecular weight of 770, an optical rotation $[\alpha]_D^{18}$ —50.5 (C=2 in methanol), and having an infrared and ultraviolet absorption spectra as shown in the accompanying FIGS. 1 and 2.

2. A process for producing antibiotic No. 1308 which comprises aerobically culturing Streptomyces 1308 (NRRL 5318) in a liquid medium containing a source of carbon, nitrogen and inorganic salts at a temperature of from 25° to 35° C. and a pH of from 6 to 9 for from 1 to 4 days, and recovering said antibiotic.

References Cited

UNITED STATES PATENTS 3,365,363   1/1968   Nishimura _____ 424—122

JEROME V. GOLDBERG, Primary Examiner

U.S. Cl. X.R.

195—80